H. N. FOSTER.
STEAM TRAP.
No. 52,038. Patented Jan. 16, 1866.
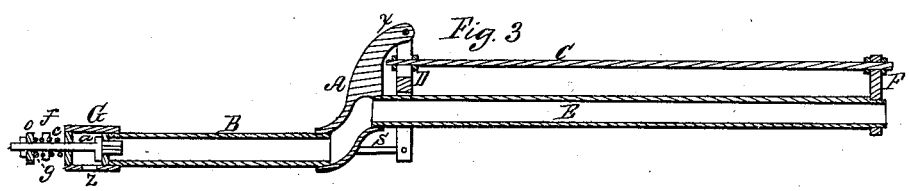
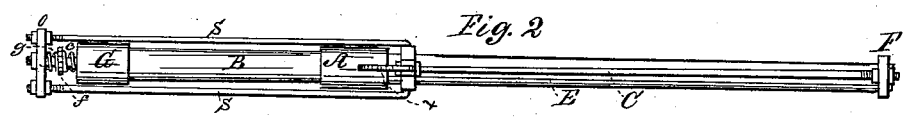
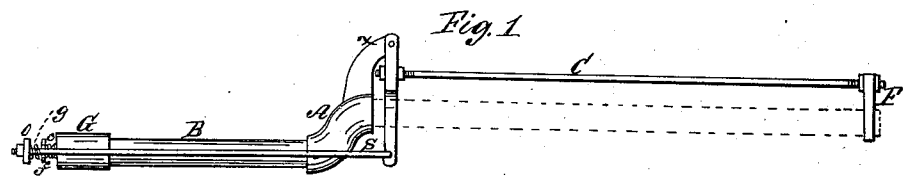
Witnesses;
H. R. Newman
Benjamin Arnold
Inventor;
Horace N Foster

UNITED STATES PATENT OFFICE.

HORACE N. FOSTER, OF EAST GREENWICH, RHODE ISLAND.

IMPROVEMENT IN STEAM-TRAPS.

Specification forming part of Letters Patent No. 52,038, dated January 16, 1866.

*To all whom it may concern:*

Be it known that I, HORACE N. FOSTER, of East Greenwich, in the county of Kent, in the State of Rhode Island, have invented a new and useful Improvement in Steam-Traps; and I do hereby declare that the following is a full and correct description thereof, reference being had to the accompanying drawings, forming part of this specification, and to the letters of reference marked thereon.

The same letters denote like parts in all the figures.

Figure 1 is a side elevation. Fig. 2 is a top view. Fig. 3 is a longitudinal section. Fig. 4 is one of the levers.

My invention is for the purpose of relieving steam-pipes, for whatever purpose they may be used, of the water resulting from the condensation of the steam.

The trap proper consists of the standard F, rod C, connecting-socket A, with arm $x$, lever D, rods $s\ s$, cross-bar $o$, springs $c\ g$, socket G, and valve $a$.

The pipe E is intended to be the pipe already in use, and to which the trap is to be attached, and B may be a piece of the same, a cut being made through the pipe and the connecting-socket A inserted to connect the parts.

The socket G, with valve $a$, is put on the outer end of B and the standard F fastened at any desired place on the steam-pipe E.

It will be seen by Fig. 4 that lever D is made with a slot in its upper part, to allow of the adjustment of the rod C, so as to obtain the proper extent of motion for the valve from the expansion of the pipe, according as it may be most convenient to place the standard F at a greater or less distance from the end of the pipe.

The great objection to most of the steam-traps heretofore made has been the rigidity of their different parts, so that when they are adjusted to close the valve when the pipe is first filled with steam, when the steam increases in pressure the increased expansion of the pipe strains the levers or connecting-rods, so that after several expansions and contractions the rods and levers refuse to close the valve as soon as the pipe is filled with steam, and the steam will escape from the valve, which it is one of the main objects of the trap to prevent. This difficulty is entirely obviated in my trap by placing a stiff spring, $g$, between the cross-bar $o$, which is loose on the valve-stem, and the nut $f$, which is fast to the valve-stem. This spring allows the pipe to expand after the valve is closed without straining any part of the trap. Consequently it will keep in working order for a great length of time. The spring $c$ is put between the nut $f$ and the end of the socket G for the purpose of opening the valve when the pipe contracts, as a little looseness in the joints of the rods and lever will take up all the motion obtained by the expansion of the pipe.

The operation is as follows: As the pipe E becomes filled with water from the condensation of the steam it becomes cooler, and consequently contracts and brings the arm $x$ nearer to the standard F, thereby relieving the rod C of the strain upon it and allowing the spring $c$ to open the valve, so that the water can escape at opening. When the steam takes the place of the water in the pipe E it becomes heated, and by expanding separates the arm $x$ and standard F, causing the rod C to draw the cross-piece $o$, by means of the rods $s\ s$, and thus closes the valve by pressing on the spring $g$. As before stated, the pipe may go on expanding from the increased heat and pressure, the only effect being to compress the spring more and hold the valve harder against the increased pressure of the steam.

Having thus described my steam-trap, what I claim as my invention is—

1. The combination of the two springs $g$ and $o$ with the valve $a$ and cross-piece $o$, substantially as described and arranged, and for the purposes set forth.

2. The lever D, having a slot, as set forth, in combination with the rods C and $s\ s$, arranged substantially as described, and for the purpose set forth.

HORACE N. FOSTER.

Witnesses:
H. R. NEWMAN,
BENJAMIN ARNOLD.